(12) United States Patent
Sung

(10) Patent No.: US 6,806,629 B2
(45) Date of Patent: Oct. 19, 2004

(54) AMORPHOUS DIAMOND MATERIALS AND ASSOCIATED METHODS FOR THE USE AND MANUFACTURE THEREOF

(76) Inventor: Chien-Min Sung, No. 4, Lane 32, Chung-Cheng Rd., Tansui, Taipei County (TW), 23911

( * ) Notice: Subject to any disclaimer, the term of this patent is extended or adjusted under 35 U.S.C. 154(b) by 396 days.

(21) Appl. No.: 10/094,426

(22) Filed: Mar. 8, 2002

(65) Prior Publication Data

US 2003/0168957 A1 Sep. 11, 2003

(51) Int. Cl.⁷ .............................. H01J 1/02; H01J 1/00; H01J 1/16; H01J 1/14; C23C 16/26
(52) U.S. Cl. ........................ 313/310; 313/309; 313/495; 313/351; 313/346 R; 313/336; 313/326; 427/249.7
(58) Field of Search ................................. 313/309, 310, 313/311, 336, 346 R, 326, 351, 495, 496, 497

(56) References Cited

U.S. PATENT DOCUMENTS

| | | | |
|---|---|---|---|
| 4,448,799 A | 5/1984 | Bergman et al. | |
| 4,511,593 A | 4/1985 | Brandolf | |
| 4,556,471 A | 12/1985 | Bergman et al. | |
| 4,620,913 A | 11/1986 | Bergman | |
| 4,622,452 A | 11/1986 | Bergman et al. | |
| 4,640,744 A | 2/1987 | Howe | |
| 5,028,546 A | 7/1991 | Hotchkiss | |
| 5,294,322 A | 3/1994 | Vetter et al. | |
| 5,458,754 A | 10/1995 | Sathrum et al. | |
| 5,562,781 A | 10/1996 | Ingram et al. | |
| 5,614,353 A | 3/1997 | Kumar et al. | |
| 5,675,972 A | 10/1997 | Edelson | |
| 5,679,895 A | 10/1997 | von Windheim | |
| 5,712,488 A | 1/1998 | Stickel et al. | |
| 5,713,775 A | 2/1998 | Geis et al. | |
| 5,722,242 A | 3/1998 | Edelson | |
| 5,777,427 A | 7/1998 | Tanaka et al. | |
| 5,874,039 A | 2/1999 | Edelson | |
| 5,959,400 A | 9/1999 | Niigaki et al. | |
| 5,981,071 A | 11/1999 | Cox | |
| 5,984,752 A | 11/1999 | Tanaka et al. | |
| 5,994,638 A | 11/1999 | Edelson | |
| 6,039,471 A | 3/2000 | Wyland | |
| 6,055,815 A | 5/2000 | Peterson | |
| 6,064,137 A | 5/2000 | Cox | |
| 6,066,399 A | 5/2000 | Hirano et al. | |
| 6,103,298 A | 8/2000 | Edelson et al. | |
| 6,132,278 A | 10/2000 | Kang et al. | |
| 6,139,964 A | 10/2000 | Sathrum et al. | |
| 6,204,595 B1 | 3/2001 | Falabella | |
| 6,214,651 B1 | 4/2001 | Cox | |
| 6,229,083 B1 | 5/2001 | Edelson | |
| 6,278,231 B1 | 8/2001 | Iwasaki et al. | |

FOREIGN PATENT DOCUMENTS

WO      WO01/39235 A2     5/2001

*Primary Examiner*—Nimeshkumar D. Patel
*Assistant Examiner*—Sharlene Leurig
(74) *Attorney, Agent, or Firm*—Thorpe North & Western, LLP

(57) ABSTRACT

An amorphous diamond material that is capable of emitting electrons in a vacuum upon the input of a sufficient amount of energy is disclosed. The material may utilize both compositional and geometrical aspects in order to maximize electron output and minimize required energy input. In one aspect, the amorphous diamond material may include at least about 90% carbon atoms with at least about 30% of such carbon atoms bonded in distorted tetrahedral coordination. Further, the material may be configured with an emission surface having an asperity height of from about 10 to about 10,000 nanometers. A variety of energy types may be used separately or in combination to facilitate electron flow, such as thermal energy, light energy, and induced electric field energy. The amorphous diamond material may be incorporated into a variety of vacuum-type devices, such as switches, laser diodes, electrical generators, and cooling devices.

37 Claims, 4 Drawing Sheets

(Regular Tetrahedral Coordination)

(Distorted Tetrahedral Coordination)

AMORPHOUS DIAMOND MATERIALS AND ASSOCIATED METHODS FOR THE USE AND MANUFACTURE THEREOF

FIELD OF THE INVENTION

The present invention relates generally to devices and methods for generating electrons from diamond-like carbon material. Accordingly, the present application involves the fields of physics, chemistry, electricity, and material science.

BACKGROUND OF THE INVENTION

Thermionic and field emission devices are well known and used in a variety of applications, such as cathode ray tubes, and field emission displays. Generally, thermionic electron emission devices operate by ejecting hot electrons over a potential barrier, while field emission devices operate by causing electrons to tunnel through a barrier. Examples of specific devices include those disclosed in U.S. Pat. Nos. 6,229,083, 6,204,595, 6,103,298, 6,064,137, 6,055,815, 6,039,471, 5,994,638, 5,984,752, 5,981,071, 5,874,039, 5,777,427, 5,722,242, 5,713,775, 5,712,488, 5,675,972, and 5,562,781, each of which is incorporated herein by reference.

Although basically successful in many applications, thermionic devices have been less successful than field emission devices, as field emission devices generally achieve a higher current output. Despite this key advantage, most field emission devices suffer from a variety of other shortcomings that limit their potential uses, including materials limitations, versatility limitations, cost effectiveness, lifespan limitations, and efficiency limitations, among others.

A variety of different materials have been used in field emitters in an effort to remedy the above-recited shortcomings, and to achieve higher current outputs using lower energy inputs. One material that has recently become of significant interest for its physical properties is diamond. Specifically, diamond has a negative electron affinity (NEA) that allows electrons held in its orbitals to be shaken therefrom with minimal energy input. However, diamond also has a high band gap that makes it an insulator and prevents electrons from moving through, or out of it. A number of attempts have been made to modify or lower the band gap, such as doping the diamond with a variety of dopants, and forming it into certain geometrical configurations. While such attempts have achieved moderate success, a number of limitations on performance, efficiency, and cost, still exist. Therefore, the possible applications for field emitters remain limited to small scale low current output applications.

As such, materials capable of achieving high current outputs in a vacuum by absorbing relatively low amounts of energy from an energy source continue to be sought through ongoing research and development efforts.

SUMMARY OF THE INVENTION

Accordingly, the present invention provides an amorphous diamond material that presents a combination of material and geometric aspects that allow the generation of electrons in a vacuum upon absorption of sufficient amounts of energy. Particularly, such a material includes at least about 90% carbon atoms with at least about 30% of such carbon atoms bonded in distorted tetrahedral coordination. The material is further configured with an electron emission surface having an asperity height of from about 100 to about 10,000 nanometers. In one aspect, the amount of carbon atoms bonded in distorted tetrahedral coordination may be at least about 50%.

The asperity of the emission surface may take a variety of configurations. However, in one aspect of the invention, the asperity has a height of about 10,000 nanometers. In another aspect, the asperity height may be about 1,000 nanometers. In addition to the height parameters, the asperity may also be configured with certain peak density parameters. In one aspect the asperity may have a peak density of greater than about 1 million peaks per square centimeter of emission surface. In another aspect, the asperity may have a peak density of greater than about 100 million peaks per square centimeter of emission surface.

A variety of energy types may be harnessed by the material of the present invention to facilitate electron flow therefrom, such as thermal energy, photonic energy, electric field energy, and combinations thereof. However, in one aspect, the energy may be thermal energy used by itself or in combination with electric field energy. In another aspect, the energy may be photonic (i.e. light energy), used either by itself, or in combination with electric field energy. In yet another aspect, the energy may be electric field energy.

A wide variety of energy intensities may be used as required in order to generate a desired electrical current with the material of the present invention. Such intensities may be determined in part, by the actual composition of the specific material used, the asperity of the emission surface thereof, and the type of energy input being used. However, in one aspect, the energy may be thermal energy that has a temperature of less than about 500° C.

The amorphous diamond material of the present invention may be further coupled to, or associated with, a number of different peripheral components in order to for various devices that benefit from the material's ability to generate electrons in a vacuum. For example, in one aspect, the amorphous diamond material recited herein may be incorporated into a device for emitting electrons that further includes an electrode coupled to the amorphous diamond material to form a cathode, and an anode positioned opposite the emission surface of the amorphous diamond material and separated therefrom by a vacuum space, into which the electrons are emitted upon input of a sufficient amount of energy.

Other components may be added as required in order to achieve a specific device. In one aspect, the electron emitting device may further include a gate positioned in the vacuum space between the emission surface and the anode, said gate being capable of creating an electric field when an electrical current is applied thereto. In another aspect, the gate may be a metal screen. In yet another aspect, the vacuum space may contain an amount of low energy cations that is sufficient to minimize repulsion forces between electrons emitted from the electron emission surface. Examples of suitable cations include without limitation, Li, Na, K, Rb, Cs, Fr, Be, Mg, Ca, Sr, Ba, and mixtures thereof. However, in one aspect, the cation may be Cs.

Those of ordinary skill in the art will readily recognize the potential for use of the present material in a wide range of devices and applications. Examples of such devices include without limitation, large and small scale electrical generators, cooling devices, transistors, switches, amplifiers, cathodes, electrodes, and ring laser gyroscopes among others. However, in one aspect, the device may be an electrical generator. In another aspect, the device may be a cooling device. In yet another aspect, such a cooling device may be capable of cooling an adjacent area to a temperature below about 100° C.

The diamond material of the present invention may be made using a variety of techniques known to those skilled in the art. Such methods generally require a carbon source to be provided, and the formation of the amorphous diamond material using a deposition technique. However, in one aspect, the amorphous diamond material may be formed using a cathodic arc technique.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and, "the" include plural referents unless the context clearly dictates otherwise. Thus, for example, reference to "a diamond particle" includes one or more of such particles, reference to "a carbon source" includes reference to one or more of such carbon sources, and reference to "a cathodic arc technique" includes reference to one or more of such techniques.

Definitions

In describing and claiming the present invention, the following terminology will be used in accordance with the definitions set forth below.

As used herein, "vacuum" refers to a pressure condition of less than $10^{-2}$ torr.

Figure 6:
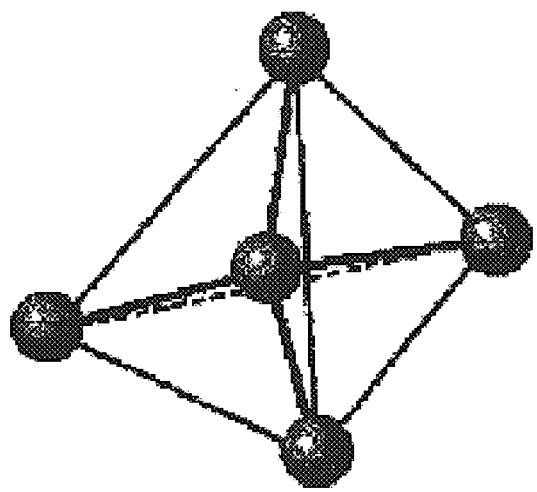
FIG. 6 shows a perspective view of a diamond tetrahedron having regular or normal tetrahedron coordination of carbon bonds.

As used herein, "diamond" refers to a crystalline structure of carbon atoms bonded to other carbon atoms in a lattice of tetrahedral coordination known as $sp^3$ bonding. Specifically, each carbon atom is surrounded by and bonded to four other carbon atoms, each located on the tip of a regular tetrahedron. Further, the bond length between any two carbon atoms is 1.54 angstroms at ambient temperature conditions, and the angle between any two bonds is 109 degrees, 28 minutes, and 16 seconds. A representation of carbon atoms bonded in a normal or regular tetrahedron configuration in order to form diamond is shown in FIG. 6. The structure and nature of diamond, including its physical and electrical properties are well known in the art.

Figure 7:
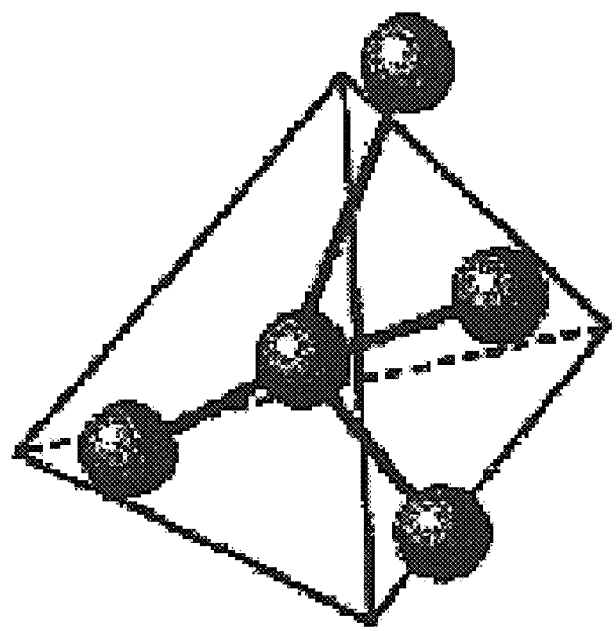
FIG. 7 shows a perspective view of a carbon tetrahedron having irregular, or abnormal tetrahedron coordination of carbon bonds.

As used herein, "distorted tetrahedral coordination" refers to a tetrahedral bonding configuration of carbon atoms that is irregular, or has deviated from the normal tetrahedron configuration of diamond as described above. Such distortion generally results in lengthening of some bonds and shortening of others, as well as the variation of the bond angles between the bonds. Additionally, the distortion of the tetrahedron alters the characteristics and properties of the carbon to effectively lie between the characteristics of carbon bonded in $sp^3$ configuration (i.e. diamond) and carbon bonded in $sp^2$ configuration (i.e. graphite). One example of material having carbon atoms bonded in distorted tetrahedral bonding is amorphous diamond. A representation of carbon atoms bonded in distorted tetrahedral coordination is shown in FIG. 7.

As used herein, "amorphous diamond" refers to a material having carbon atoms as the majority element, with a substantial amount of such carbon atoms bonded in distorted tetrahedral coordination. Notably, a variety of other elements may be included in the carbonaceous material as either impurities, or as dopants, including without limitation, hydrogen, sulfur, phosphorous, boron, nitrogen, silicon, tungsten, etc. In one aspect, the amount of carbon in the amorphous diamond may be at least about 90%, with at least about 30% of such carbon being bonded in distorted tetrahedral coordination.

As used herein, "asperity" refers to the roughness of a surface as assessed by various characteristics of the surface anatomy. Various measurements may be used as an indicator of surface asperity, such as the height of peaks or projections thereon, and the depth of valleys or concavities depressing therein. Further, measures of asperity include the number of peaks or valleys within a given area of the surface (i.e. peak or valley density), and the distance between such peaks or valleys.

As used herein, "metallic" refers to a metal, or an alloy of two or more metals. A wide variety of metallic materials are known to those skilled in the art, such as aluminum, copper, chromium, iron, steel, stainless steel, titanium, tungsten, zinc, zirconium, molybdenum, etc., including alloys and compounds thereof.

As used herein, "substantial" when used in reference to a quantity or amount of a material, or a specific characteristic thereof, refers to an amount that is sufficient to provide an effect that the material or characteristic was intended to provide. Further, "substantially free" when used in reference to a quantity or amount of a material, or a specific characteristic thereof, refers to the absence of the material or characteristic, or to the presence of the material or characteristic in an amount that is insufficient to impart a measurable effect, normally imparted by such material or characteristic.

As used herein, "electron affinity" refers to the tendency of an atom to attract or bind a free electron into one of its orbitals. Further, "negative electron affinity" (NEA) refers to the tendency of an atom to either repulse free electrons, or to allow the release of electrons from its orbitals using a small energy input. Those of ordinary skill in the art will recognize that negative electron affinity may be imparted by the compositional nature of the material, or its geometric configuration, or a combination thereof.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 micrometer to about 5 micrometers" should be interpreted to include not only the explicitly recited values of about 1 micrometer to about 5 micrometers, but also include individual values and sub-ranges within the indicated range. Thus, included in this numerical range are individual values such as 2, 3, and 4 and sub-ranges such as from 1–3, from 2–4, and from 3–5, etc.

This same principle applies to ranges reciting only one numerical value. Furthermore, such an interpretation should apply regardless of the breadth of the range or the characteristics being described.

The Invention

The present invention involves an amorphous diamond material that may be used to generate electrons in a vacuum upon input of a sufficient amount of energy. As recited in the background section, utilization of a number of materials have been attempted for this purpose, including the diamond materials and devices disclosed in WO 01/39235, which is incorporated herein by reference. Due to its high band gap properties, diamond is unsuitable for use as an electron emitter unless modified to reduce or alter the band gap. Thus far, the techniques for altering diamond band gap, such as doping the diamond with various dopants, and configuring the diamond with certain geometric aspects have yielded electron emitters of questionable use.

It has now been found that various amorphous diamond materials can easily emit electrons when an energy source is applied. Such materials retain the NEA properties of diamond, but do not suffer from the band gap issues of pure diamond. Thus, electrons energized by applied energy are allowed to move readily through the amorphous diamond material, and be emitted using significantly lower energy inputs, than those required by diamond. Further, the amorphous diamond material of the present invention has been found to have a high energy absorption range, allowing for a wider range of energies to be converted into electrons, and thus increasing the conversion efficiency.

A variety of specific amorphous diamond materials that provide the desired qualities are encompassed by the present invention. One aspect of the amorphous diamond material that facilitates electron emission is the distorted tetrahedral coordination with which many of the carbon atoms are bonded. Tetrahedral coordination allows carbon atoms to retain the $sp^3$ bonding characteristic that may facilitate the surface condition required for NEA, and also provides a plurality of effective band gaps, due to the differing bond lengths of the carbon atom bonds. In this manner, the band gap issues of pure diamond are overcome, and the amorphous diamond material becomes effective for emitting electrons in a vacuum. In one aspect of the present invention, the amorphous diamond material may contain at least about 90% carbon atoms with at least about 30% of such carbon atoms being bonded with distorted tetrahedral coordination. In another aspect, the amorphous diamond may have at least 50% of the carbon atoms bonded in distorted tetrahedral coordination.

Figure 1:
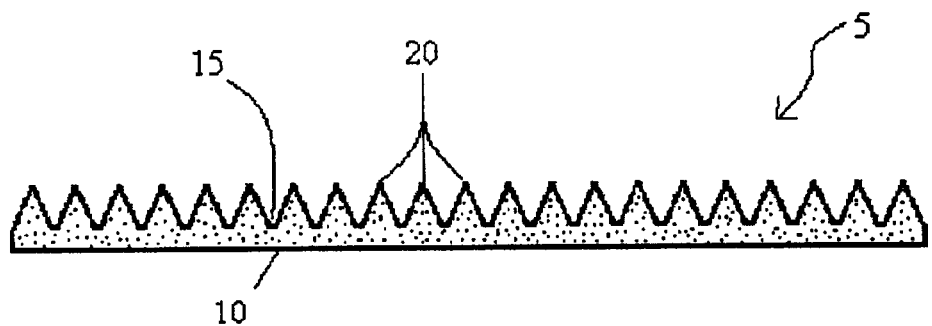
FIG. 1 shows a side view of one embodiment of an amorphous diamond material in accordance with the present invention.

Another aspect of the present amorphous diamond material that facilitates electron emission is the presence of certain geometric configurations. Referring now to FIG. 1, is shown a side view of one embodiment of a configuration for the amorphous diamond material 5, made in accordance with the present invention. Specifically, the amorphous diamond material has an energy input surface 10, that receives energy, for example, thermal energy, and an emission surface 15 that emits electrons therefrom. In order to further facilitate the emission of electrons, the emission surface may be configured with an emission surface that has a roughness, or asperity, that focuses electron flow and increases current output, such asperity represented here by a plurality of peaks or projections 20.

While a number of prior devices have attempted to thusly focus electrons, for example by imparting a plurality of pyramids or cones to an emission surface, none have as of yet, been able to achieve the high current output required to be viable for many applications, using a feasible energy input. More often than not, this inadequacy results from the fact that the pyramids, cones, etc. are too large and insufficiently dense to focus the electrons as needed to enhance flow. Such sizes are often greater than several micrometers in height, thus allowing only a projection density of less than 1 million per square centimeter. While carbon nanotubes have achieved higher outputs than other known emitters, carbon nanotubes have shown to be fragile, short lived, and inconsistent in the levels and flow of electrons achieved.

In one aspect of the present invention, the asperity of the emission surface may have a height of from about 10 to about 10,000 nanometers. In another aspect, the asperity height may be about 10,000 nanometers. In yet another aspect, the asperity height may be about 1,000 nanometers. Further, the asperity may have a peak density of at least about 1 million peaks per square centimeter of emission surface. In yet another aspect, the peak density may be at least about 100 million peaks per square centimeter of the emission surface. In a further aspect, the peak density may be at least about 1 billion peaks per square centimeter of the emission surface. Any number of height and density combinations may be used in order to achieve a specific emission surface asperity, as required in order to generate a desire electron output. However, in one aspect, the asperity may include a height of about 10,000 nanometers and a peak density of at least about, or greater than about 1 million peaks per square centimeter of emission surface. In yet another aspect, the asperity may include a height of about 1,000 nanometers and a peak density of at least about, or greater than 1 billion peaks per square centimeter of emission surface.

The amorphous diamond material of the present invention is capable of utilizing a variety of different energy input types in order to generate electrons. Examples of suitable energy types may include without limitation, heat or thermal energy, light or photonic energy, and electric field energy. Those of ordinary skill in the art will recognize other energy types that may be capable of sufficiently vibrating the electrons contained in the amorphous diamond material to effect their release and movement through and out of the material. Further, various combinations of energy types may be used in order to achieve a specifically desired result, or to accommodate the functioning of a particular device into which the amorphous diamond material is incorporated.

In one aspect of the invention, the energy type used may be thermal energy. To this end, an energy absorber may be used in connection with or coupled to the amorphous diamond material of the present invention, that aids in the absorption and transfer of heat into the material. As will be recognized by those of ordinary skill in the art, such an absorber may be composed of a variety of materials that are predisposed to the absorption of thermal energy, such as carbon black, etc. In one aspect, the thermal energy absorbed by the amorphous diamond material may have a temperature of less than about 500° C.

In another aspect of the present invention, the energy used to facilitate electron flow may be electric field energy (i.e. a positive bias). Such an electric field may be applied to the amorphous diamond material using the gate described below, or with a variety of other mechanisms known to those of ordinary skill in the art.

Figure 2:
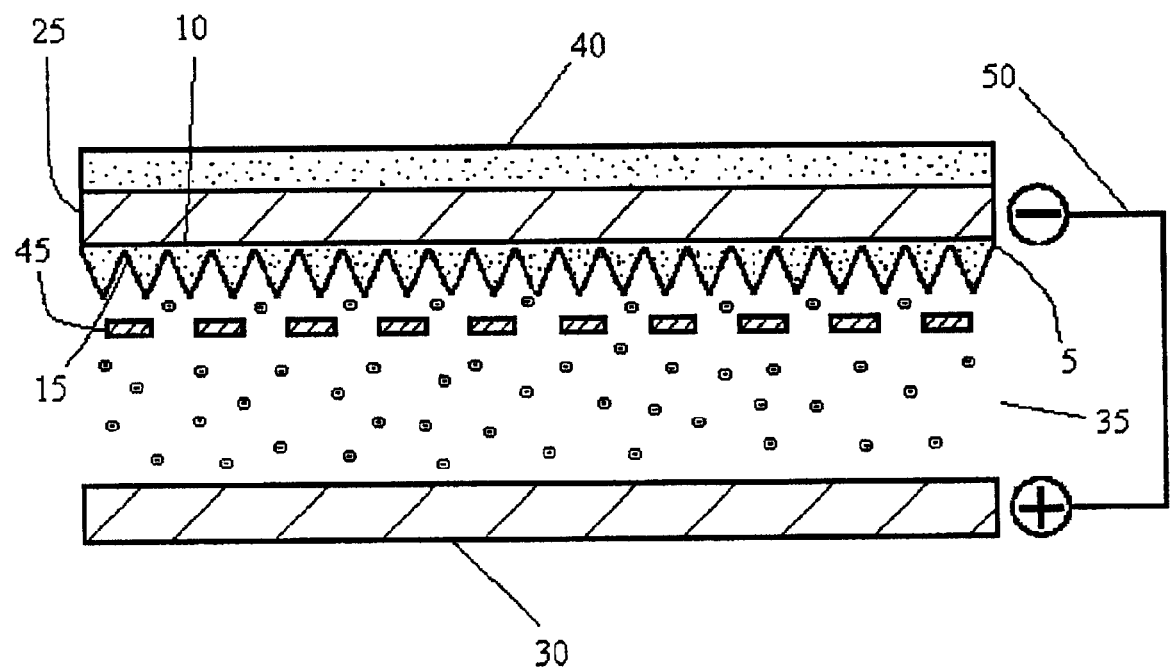
FIG. 2 shows a side view of the amorphous diamond material of FIG. 1 assembled with various components to form a device that is capable of emitting electrons in a vacuum by absorbing a sufficient amount of energy.

The amorphous diamond material of the present invention may be further coupled to, or associated with a number of different components in order to create various devices. Referring now to FIG. 2, is shown one embodiment of an electrical generator in accordance with the present invention. Notably, the amorphous diamond material 5 has an electrode 25 coupled to the input surface 10 to form a cathode. Further, an energy collector 40 is coupled to the electrode. The energy collector may be included as desired, in order to enhance the collection and transmission of thermal or photonic energy to the amorphous diamond material. An anode 30 is placed adjacent to the emission surface 15 of the amorphous diamond material, with a vacuum space 35 separating the emission surface from the anode. A gate 45 that is capable of inducing an electric field, is placed in the vacuum space adjacent to the emission surface, and may in some aspects, be coupled thereto, or otherwise placed in communication therewith, for example by a dielectric support (not shown). Those of ordinary skill in the art will readily recognize other components that may, or should, be added to the assembly of FIG. 2 in order to achieve a specific purpose, or make a particular device. By way of example without limitation, a connecting line 50 may be placed between the cathode and the anode to form a complete circuit and allow electricity to pass that may be used to run one or more electricity requiring devices (not shown), or perform other work. Further, input and output lines, as well as an electricity source (not shown) may be connected to the gate, in order to provide the current required to induce an electric field, or positive bias, as well as other needed components to achieve a specific device, will be readily recognized by those of ordinary skill in the art.

The above-recited components may take a variety of configurations and be made from a variety of materials. In one aspect, the gate 45 may be made of an electrically conductive, or metal material, and may be either coupled to the emission surface 15 using an insulator (not shown), that may also serve as a spacer or a support. In another aspect, the gate may be a metal screen or mesh. Such a screen or mesh may be supported in the device at lateral ends thereof, and therefore be spaced apart from the emission surface by only vacuum space. When so configured, the need for an insulator as recited above is removed. Further, suitable electrically conductive materials and configurations will be readily recognized by those skilled in the art for the electrode 25 and the anode 30. Such materials and configurations may be determined in part by the function of the device into which the assembly is incorporated.

One of the factors that impedes or, at least to some extent, slows the emission of electrons from the emission surface, is the presence of other electrons already emitted into the vacuum space. Specifically, the negative charge of the electrons present in the vacuum space repulses to some degree, electrons ready for emission into the vacuum space. As such, in one aspect of the present invention, the vacuum space may contain an amount of low energy cations that is sufficient to minimize the repulsion forces between electrons. A number of cations are suitable for such a purpose, including without limitation, cations of, Li, Na, K, Rb, Cs, Fr, Be, Mg, Ca, Sr, Ba, and mixtures thereof. However, in one aspect, the cation may be a Cs cation.

Because of the ease with which electrons may be generated using the amorphous diamond material of the present invention, it has been found that inducing electron flow using an applied electric field, facilitates the absorption of heat at the electron input surface, thus enabling the electron emitter of the present invention to be used as a cooling device. As such, the present invention encompasses a cooling device that is capable of absorbing heat by emitting electrons in a vacuum under an induced electrical field. Such a device may take a variety of forms and utilize a number of supporting components, such as the components recited in the electrical generator above. In one aspect, the cooling device is capable of cooling an adjacent area to a temperature below 100° C.

The amorphous diamond material used in the present invention may be produced using a variety of processes known to those skilled in the art. However, in one aspect, the material may be made using a cathodic arc method. Various cathodic arc processes are well known to those of ordinary skill in the art, such as those disclosed in U.S. Pat. Nos. 4,448,799, 4,511,593, 4,556,471, 4,620,913, 4,622,452, 5,294,322, 5,458,754, and 6,139,964, each of which is incorporated herein by reference. Generally speaking, cathodic arc techniques involve the physical vapor deposition (PVD) of carbon atoms onto a target, or substrate. The arc is generated by passing a large current through a graphite electrode that serves as a cathode, and vaporizing carbon atoms with the current. The vaporized atoms also become ionized to carry a positive charge. A negative bias of varying intensity is then used to drive the carbon atoms toward an electrically conducting target. If the carbon atoms contain a sufficient amount of energy (i.e. about 100 eV) they will impinge on the target and adhere to its surface to form a carbonaceous material, such as amorphous diamond.

In general, the amount of energy contained in the atoms can be adjusted by the amount of applied bias, and the deposition rate can be controlled by the arc current. Control of these parameters as well as others may also adjust the distortion of the carbon atom tetrahedral coordination (i.e. $sp^3/sp^2$ ratio), and the geometry, or configuration of the amorphous diamond material (i.e. for example, a high negative bias may accelerate carbon atoms and increase $sp^3$ bonding). Further, increasing the arc current may increase the rate of target bombardment with high flux carbon ions. As a result, temperature may rise so that the deposited carbon will convert to more stable graphite. Thus, final configuration and composition (i.e. band gaps, NEA, and emission surface asperity) of the amorphous diamond material may be controlled by manipulating the cathodic arc conditions under which the material is formed.

The amorphous diamond material of the present invention may also be used in applications that have an atmospheric or positive pressure. For example, electrodes and cathodes may be designed to utilize the amorphous diamond material, such as coating the metal electron emitter in a fluorescent light bulb. In this case, not only would the amorphous diamond coating act to protect and greatly lengthen the life of the metal electrode, but would also aid in electron emission. As a result, the voltage required to illuminate the gas contained within the light bulb would be greatly reduced, which in turn reduces the temperature of the metal electron emitter. Such a combination of advantages would work together to significantly lengthen the life of the fluorescent light. Further, other devices which require the emission of electrons in order to create light, would reap similar benefits, such as scanners, photocopying machines, LCD panes, and automobile lights among others.

Moreover, amorphous diamond may be coated onto ordinary electrodes to facilitate the flow of electrons. Such electrodes may be used in batteries and electro-deposition of metals, such as electroplating. In one aspect, the electrodes may be used in an aqueous solution. For example, electrodes that are used to monitor the quality of water, or other food stuff, such as juice, beer, soda, etc. by measuring the resistivity of the water. Due to its anti-corrosive properties, electrodes of amorphous diamond pose a significant advantage over conventional electrodes.

One particular application where amorphous diamond electrodes would be of significant advantage, is in electro-deposition applications. Specifically, one problem experienced by most electro-deposition devices is the polarization of the electrode by the absorption of various gasses. However, due to the strongly inert nature of amorphous diamond, electrodes made therefrom are virtually unpolarizable. Further, this inert nature creates an electric potential in aqueous solution that is much higher than normal. Under normal circumstances, such a voltage would evaporate the water. However, due to the high potential of amorphous diamond, the solute contained in the solution is driven out before the water can evaporate. This aspect is very useful, as it enables the electro-deposition of elements with high oxidation potentials, such as Li and Na which has been extremely difficult, if not impossible in the past.

In a similar aspect, because of the high potential achieved by amorphous diamond electrodes in solution, solutes that are present in very minute amounts may be driven out of solution and detected. Therefore, the material of the present invention is also useful as part of a highly sensitive diagnostic tool or device which is capable of measuring the presence of various elements in solution, for example, lead, in amounts as low as parts per billion (ppb). Such applications include the detection of nearly any element that can be driven or attracted to a electrical charge, including biomaterials, such as blood and other bodily fluids, such as urine.

As alluded to above, the present invention encompasses methods for making the amorphous diamond material disclosed herein, as well as methods for the use thereof. In addition to the electrical generator and cooling devices recited above, a number of devices that operate on the principles of emitting electrons in a vacuum may beneficially utilize the amorphous diamond material of the present invention. A number of such devices will be recognized by those skilled in the art, including without limitation, transistors, ultra fast switches, ring laser gyroscopes, current amplifiers, microwave emitters, and various other electron beam devices.

In one aspect, a method for making an amorphous diamond material capable of emitting electrons in a vacuum by absorbing a sufficient amount of energy, includes the steps of providing a carbon source, and forming a an amorphous diamond material therefrom, using a cathodic arc method. Such a method may further include associating or coupling a gate to the emission surface for enhancing electron emission when an electric field is applied thereto. Further, the method may include placing an amount of low energy cations in a vacuum around the emission surface, that is sufficient to minimize repulsion forces between electrons emitted from the electron emission surface.

In one aspect, a method for generating a flow of electrons in a vacuum, or generating an electrical current may include the steps of forming an amorphous diamond material as recited herein, and inputting an amount of energy into the material that is sufficient to generate electron flow.

The following are examples illustrate various methods of making electron emitters in accordance with the present invention.

EXAMPLE 1

Figure 3:
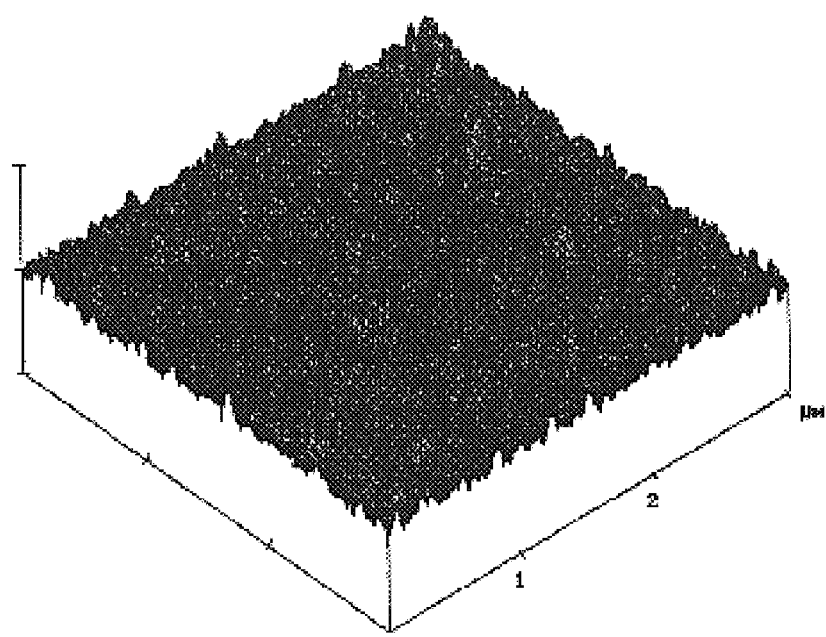
FIG. 3 shows a perspective view of one embodiment of an amorphous diamond material made using a cathodic arc procedure in accordance with one aspect of the present invention.
Figure 4:
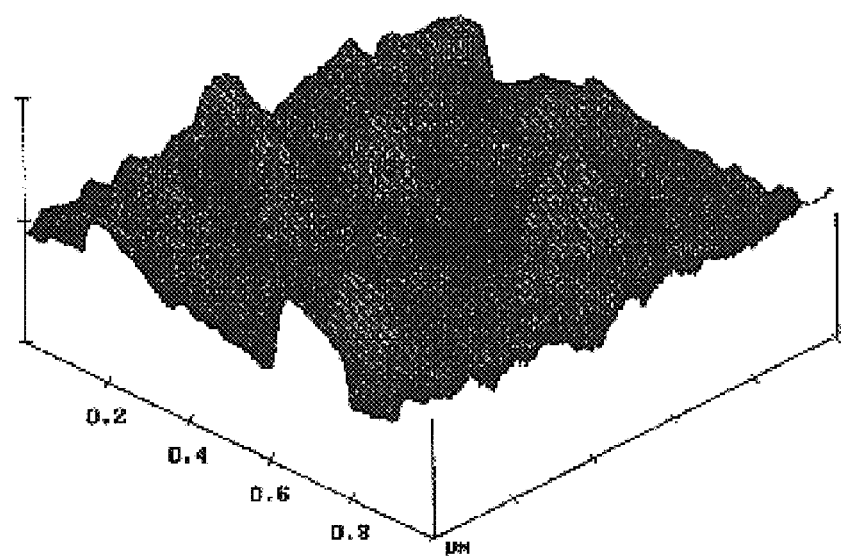
FIG. 4 shows an enlarged view of a section of the amorphous diamond material shown in FIG. 3.

An amorphous diamond material was made as shown in FIG. 3, using cathodic arc deposition. Notably, the asperity of the emission surface has a height of about 200 nanometers, and a peak density of about 1 billion peaks per square centimeter. In the fabrication of such material, first, a silicon substrate of N-type wafer with (200) orientation was etched by Ar ions for about 20 minutes. Next, the etched silicon wafer was coated with amorphous diamond using a Tetrabond® coating system made by Multi-Arc, Rockaway, N.J. The graphite electrode of the coating system was vaporized to form an electrical arc with a current of 80 amps, and the arc was drive by a negative bias of 20 volts toward the silicon substrate, and deposited thereon. The resulting amorphous diamond material was removed from the coating system and observed under an atomic force microscope, as shown in FIGS. 3 and 4.

Figure 5:
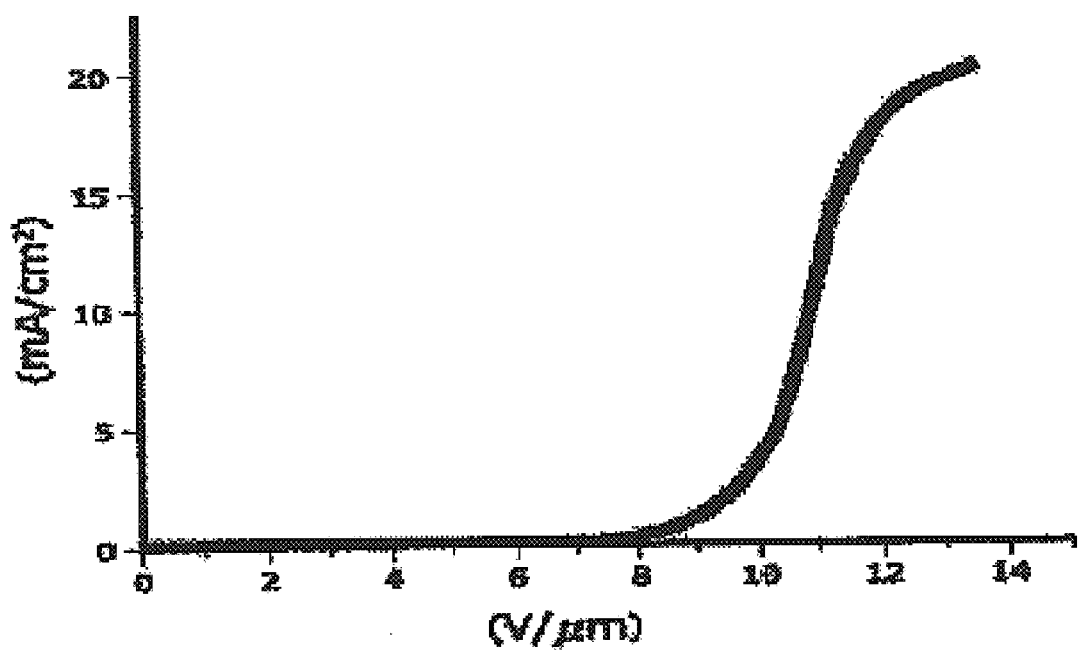
FIG. 5 shows a graphical representation of an electrical current generated under an induced electrical field by one embodiment of the amorphous diamond.

The amorphous diamond material was then coupled to an electrode to form a cathode, and an external electrical bias was applied. The resultant electrical current generated by the amorphous diamond material was measured and recorded as shown in FIG. 5.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An amorphous diamond material comprising:
    at least about 90% carbon atoms with at least about 30% of said carbon atoms bonded in distorted tetrahedral coordination, said diamond material being configured with an electron emission surface having an asperity height of from about 10 to about 10,000 nanometers, and being capable of emitting electrons upon input of a sufficient amount of energy into the material.

2. The material of claim 1, wherein the asperity height is about 10,000 nanometers.

3. The material of claim 1, wherein the asperity height is about 100 to 1,000 nanometers.

4. The material of claim 2, wherein the asperity has a peak density of greater than about 1 million peaks per square centimeter of emission surface.

5. The material of claim 3, wherein the asperity has a peak density of greater than about 1 billion peaks per square centimeter of emission surface.

6. The material of claim 1, wherein at least about 50% of said carbon atoms are bonded with distorted tetrahedral coordination.

7. The material of claim 1, wherein the energy is a member selected from the group consisting of thermal energy, photonic energy, electric field energy, and combinations thereof.

8. The material of claim 7, wherein the energy is thermal energy.

9. The material of claim 7, wherein the energy is photonic energy.

10. The material of claim 8, wherein the thermal energy has a temperature of less than about 500° C.

11. A device for emitting electrons comprising:
   an amorphous diamond material having at least about 90% carbon atoms with at least about 30% of said carbon atoms bonded in distorted tetrahedral coordination, said diamond material being configured with an electron emission surface having an asperity height of from about 10 to about 10,000 nanometers;
   an electrode coupled to the amorphous diamond material to form a cathode; and
   an anode positioned opposite the emission surface of the amorphous diamond material and separated therefrom by a vacuum space, into which the electrons are emitted upon input of a sufficient amount of energy.

12. The device of claim 11, further comprising a gate positioned in the vacuum space between the emission surface and the anode, said gate being capable of creating an electric field when positive bias is applied thereto.

13. The device of claim 12, wherein the gate is a metal screen.

14. The device of claim 11, further comprising an amount of low energy cations in the vacuum space that is sufficient to minimize repulsion forces between electrons emitted from the electron emission surface.

15. The device of claim 14, wherein the low energy cation is a member selected from the group consisting of: , Li, Na, K, Rb, Cs, Fr, Be, Mg, Ca, Sr, Ba, and mixtures thereof.

16. The device of claim 15, wherein the cation is Cs.

17. The device of claim 11, wherein the asperity height of the electron emission surface is about 10,000 nanometers.

18. The device of claim 11, wherein the asperity height of the emission surface is about 100 to 1,000 nanometers.

19. The device of claim 17, wherein the asperity has a peak density of greater than about 1 million peaks per square centimeter of emission surface.

20. The device of claim 18, wherein the asperity has a peak density of greater than about 1 billion peaks per square centimeter of emission surface.

21. The device of claim 11, wherein at least about 50% of said carbon atoms bonded with distorted tetrahedral coordination.

22. The device of claim 11, wherein the energy is a member selected from the group consisting of thermal energy, photonic energy, electric field energy, and combinations thereof.

23. The device of claim 22, wherein the energy is thermal energy.

24. The device of claim 22, wherein the energy is photonic energy.

25. The device of claim 24, wherein the thermal energy has a temperature of less than about 500° C.

26. The device of claim 22, wherein the energy is an electric field energy.

27. The device of claim 11, wherein the device is configured for use as an electrical generator.

28. The device of claim 11, wherein the device is configured for use as a solar cell.

29. The device of claim 11, wherein the device is configured for use as a cooling device.

30. The device of claim 29, wherein the cooling device is a heat spreader for cooling an integrated circuit.

31. The device of claim 29, wherein the device is capable of cooling an adjacent area to a temperature below about 100° C.

32. A method for making an amorphous diamond material as recited in any one of claims 1–6, comprising the steps of:
   providing a carbon source; and
   forming the amorphous diamond material using a cathodic arc technique.

33. A method of enhancing the electron output of an electrode, comprising the step of coating the electrode with an amorphous diamond material as recited in claim 1.

34. A method of lengthening the effective lifespan of an electrode, comprising the step of coating the electrode with an amorphous diamond material as recited in claim 1.

35. The method of either claim 33 or 34, wherein the electrode is part of a battery.

36. The method of either claim 33 or 34 wherein the electrode is part of an electro-deposition device.

37. The method of either claim 33 or 34 wherein the electrode is part of a light emitting device.

* * * * *